(12) United States Patent
Lansing et al.

(10) Patent No.: US 8,245,582 B2
(45) Date of Patent: Aug. 21, 2012

(54) METHOD AND APPARATUS FOR MEASURING A GAS FLOW VELOCITY

(75) Inventors: John Lansing, Houston, TX (US); Toralf Dietz, Dresden (DE)

(73) Assignee: Sick Engineering GmbH, Ottendorf-Okrilla (DE)

(*) Notice: Subject to any disclaimer, the term of this patent is extended or adjusted under 35 U.S.C. 154(b) by 125 days.

(21) Appl. No.: 12/883,363

(22) Filed: Sep. 16, 2010

(65) Prior Publication Data

US 2012/0060944 A1   Mar. 15, 2012

(30) Foreign Application Priority Data

Sep. 9, 2010  (EP) .................................... 10009387

(51) Int. Cl.
*G01F 1/66* (2006.01)

(52) U.S. Cl. .................................... 73/861.29

(58) Field of Classification Search ............... 73/861.29, 73/861.31, 861.27
See application file for complete search history.

(56) References Cited

U.S. PATENT DOCUMENTS

| | | | |
|---|---|---|---|
| 4,646,575 A * | 3/1987 | O'Hair et al. | 73/861.31 |
| 5,437,194 A * | 8/1995 | Lynnworth | 73/861.27 |
| 7,752,919 B2 * | 7/2010 | Straub et al. | 73/861.29 |
| 2007/0022824 A1 | 2/2007 | Bailey et al. | |
| 2009/0097354 A1 | 4/2009 | Straub, Jr. | |
| 2010/0010756 A1 | 1/2010 | Derr et al. | |

OTHER PUBLICATIONS

Extended European Search Report issued on Dec. 10, 2010, in counterpart European Patent Application No. 10009387.1, three (3) pages.

* cited by examiner

*Primary Examiner* — Jewel V Thompson
(74) *Attorney, Agent, or Firm* — The Nath Law Group; Jerald L. Meyer; Stanley N. Protigal

(57) ABSTRACT

The invention relates to a method of measuring a gas flow velocity using an ultrasonic gas flow meter, wherein said ultrasonic gas flow meter includes a horizontal piping through which gas can flow in a flow direction and which has a central axis, at least one pair of measurement paths of equal length spaced apart, extending parallel to one another in separate horizontal planes and inclined to said flow direction, wherein each horizontal plane of a pair of measurement paths is vertically offset by an equal predefined distance from said central axis, wherein an ultrasonic transducer is arranged at each end of said measurement path and each ultrasonic transducer is adapted to selectively act as an ultrasonic transmitter and an ultrasonic receiver, the method comprising the steps of measuring a flow velocity of said gas in a measurement path arranged in an upper region of said piping, measuring a flow velocity of said gas in a measurement path arranged in a lower region of said piping and using the results of these two measurements to predict if a liquid is present in said piping during said measurement.

15 Claims, 5 Drawing Sheets

METHOD AND APPARATUS FOR MEASURING A GAS FLOW VELOCITY

Figure 1:
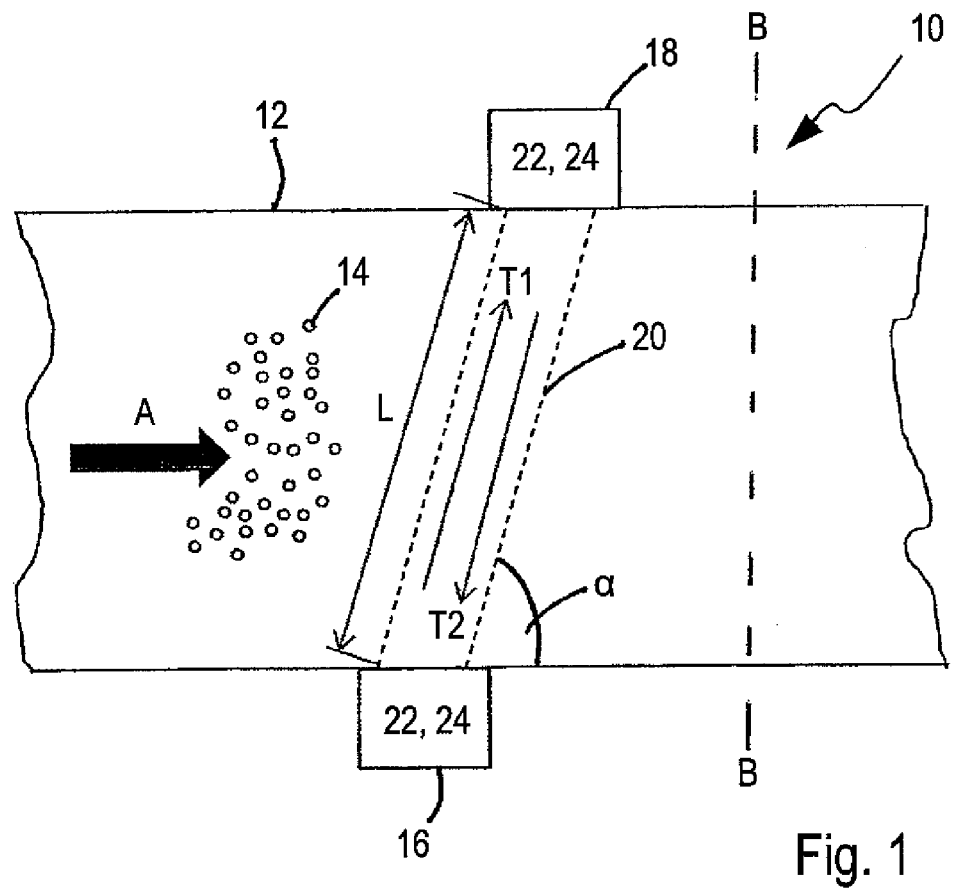

The invention relates to a method of measuring a gas flow velocity using an ultrasonic gas flow meter, to an ultrasonic gas flow meter and to a gas transport system including an ultrasonic gas flow meter.

Gas transport systems are used to transport fluids, in particular gases. To monitor an amount of fluid transported in such gas transport systems ultrasonic gas flow meters are arranged at different positions within the gas transport system.

The measurement accuracy of ultrasonic gas flow meters is primarily determined by the accuracy of the measured signal propagation times and the alignment accuracy of the components used in such ultrasonic gas flow meters. Parameters associated with the ultrasonic gas flow meter (measurement geometry and accuracy, sensor parameters and electronic parameters) are typically required to calculate the flow velocity of a gas. To improve the measurement accuracy of the flow velocity, these parameters have to be known as exactly as possible.

For example, an essential geometry parameter is the free cross-section-diameter in the region of the ultrasonic measurement paths. By multiplying the internal measurement of the flow velocity with this diameter the volume flow in the ultrasonic gas flow meter can be calculated.

However, if a liquid (e.g. water, oils, light carbons) is also present in the piping conveying the gas, a reduction of the effective-free cross-section is brought about for the gas flow. If the piping is horizontally arranged, the liquid is typically found in the lower part of the piping, in particular at the bottom of the piping, due to the gravitational force.

Due to the reduced cross-section of the piping, the gas flow velocity now increases for the same gas volume flow. However, since this increased flow velocity is still calculated using the non-corrected free cross-section, too high a volume flow is wrongly indicated by the ultrasonic gas flow meter. Unfortunately, since the liquid portion present in the geometric distribution is not known in relation to the piping cross-section, no correction of the measurement value can be effected.

To overcome this problem it is known to use so-called vertical diagnostic paths, in which the piping of an ultrasonic gas flow meter is arranged perpendicular to a rest of an e.g. horizontally arranged gas transport system through which the gas is transported. For example, U-shaped sections have to be installed in the gas transport system. However, these have the effect that unwanted liquid can collect at these U-shaped sections, also reducing the cross-section available for the gas and can also cause a blockage at these sections. These factors cause significant complications in the design, cost and arrangement of such a gas transport system.

Since these vertical diagnostic paths have to be provided to correct for an amount of liquid present and the gas transport system can usually not be extended arbitrarily in the vertical direction, a rather complex gas transport system is required by the prior art, to measure a liquid content present in said gas transport systems.

It is therefore an object of the present invention to provide a method of measuring the flow velocity of a gas present in a gas transport system more efficiently and more accurately.

This object is satisfied by a method in accordance with claim 1. The dependent claims are directed to preferred embodiments of the method in accordance with the invention.

The inventive method serves for the measurement of a gas flow velocity using an ultrasonic gas flow meter, wherein said ultrasonic gas flow meter includes a horizontal piping through which gas can flow in a flow direction and which has a central axis, at least one pair of measurement paths of equal length spaced apart, extending parallel to one another in separate horizontal planes and inclined to said flow direction, wherein each horizontal plane of a pair of measurement paths is vertically offset by an equal predefined distance from said central axis, wherein an ultrasonic transducer is arranged at each end of said measurement path and each ultrasonic transducer is adapted to selectively act as an ultrasonic transmitter and an ultrasonic receiver, the method comprising the steps of measuring a flow velocity of said gas in a measurement path arranged in an upper region of said piping, measuring a flow velocity of said gas in a measurement path arranged in a lower region of said piping and using the results of these two measurements to predict if a liquid is present in said piping during said measurement.

It has been found that the flow velocity measured varies in the different measurement paths of an ultrasonic gas flow meter. In particular, when a liquid is present in a system having symmetrically arranged measurement paths in a horizontally arranged ultrasonic gas flow meter, the variation in the flow velocity measured from the symmetrically arranged measurement paths can be used to determine that the liquid is present.

This now advantageously allows the use of a horizontally arranged ultrasonic gas flow meter which lies in a plane of a gas transport system and does not need to be arranged perpendicular to the plane of a generally horizontally arranged gas transport system to determine if an amount of liquid is present in the piping. This is because in a dry piping, a gas flow will have similar flow conditions in each measurement path for symmetrically arranged measurement path positions.

It is noted that the invention works particularly well for horizontally orientated gas transport systems. However, it is needless to say that the invention can also be used for gas transport systems, in which a horizontal piping is only present in the region of the ultrasonic gas flow meter.

When liquid is present in the piping this normally collects at the bottom of the piping due to a gravitational force. The flow velocity of a measurement path or measurement paths arranged in a lower region of the piping will produce a reduced flow velocity measurement compared to a measurement path arranged in an upper region of the piping.

In an embodiment said ultrasonic gas flow meter can measure a flow velocity of said gas flowing through said piping on the basis of differences between propagation times of ultrasonic signals transmitted and received between each pair of transducers and propagating in opposite directions along each measurement path.

Using a so-called transit time ultrasonic gas flow meter, the current speed of sound of the gas transported in the piping can easily be measured, simplifying the measurement system used, as no moveable parts are required to measure the speed of sound, which reduces the maintenance demand in cost and effort significantly.

In an embodiment in accordance with the invention a comparison of said flow velocity from said upper region to said flow velocity from said lower region is carried out.

Since the presence of a liquid at the bottom of a piping generally causes a reduction in the measured flow velocity in the lower part of the piping, a comparison between the flow velocity in the lower region of the piping to the flow velocity in the upper region of the piping advantageously allows the determination of whether a liquid is present in the piping or not.

In a further embodiment in accordance with the invention said measurement of the respective flow velocities is repeated at a predetermined frequency and for a predetermined time period, to form a mean flow velocity and a statistical spread for each measurement path.

Said statistical spread is correlated to a turbulence present in the measurement path. By repeating the measurement of the flow velocity of a gas present in the piping several times, the statistical error from a single measurement can be significantly reduced which increases the reliability of the measured flow velocity significantly. The resultant statistical spread is indicative of disturbances and perturbations present in the gas flow detected in the measurement path. Thus, the statistical spread is also referred to as the path turbulence. In the following the path turbulence will simply be referred to as turbulence and hence repeating the measurement of the flow velocity offers the opportunity of indirectly measuring the turbulence associated with the gas flow in the region of the different measurement paths.

In a further embodiment in accordance with the invention a comparison between said turbulence present in said measurement paths is carried out to predict if a liquid is present in said piping during said measurement.

When liquid is present in a piping, not only will the flow velocity in the lower region vary relative to the flow velocity in the upper region, but the turbulence in the lower region will simultaneously increase relative to the turbulence measured in the upper region, such that a comparison of the turbulence allows the determination of whether liquid is present in the piping or not. Thus, by not only measuring the flow velocity, but also by measuring the turbulence in the piping one can independently determine if a liquid is present or not.

In a further embodiment in accordance with the invention a turbulence ratio is formed by dividing a sum of said turbulences measured for each measurement path arranged in said lower region by a sum of said turbulences measured for each measurement path arranged in said upper region.

By calculating a turbulence ratio between the measurement paths of the lower region of the piping and the upper region of the piping, one is automatically in the position to recognize if liquid is present in the piping, since differences in the ratio indicate the presence of a liquid.

If said turbulence ratio is approximately equal to 1, said piping can be considered to contain virtually no liquid and if said turbulence ratio is greater than 1 said piping can be considered to contain an amount of liquid.

If the turbulence present in the upper region of the piping is approximately the same as the turbulence measured in the lower region of the piping, one can assume that virtually no liquid is present in the piping. Thus, even if a liquid had previously been present in the piping and a residual amount of liquid is still present, i.e. a thin layer of oil covering part or all of the interior wall of the piping, but the residual liquid does not influence the measurement of the gas flow velocity relevantly, then the ultrasonic gas flow meter considers no liquid to be present. In contrast to this, however, if the turbulence ratio measured is greater than 1, one has to assume that sufficient liquid is present to cause a faulty measurement of the gas flow velocity and a correction of this measured gas flow velocity has to take place.

In a further embodiment in accordance with the invention a velocity ratio is formed by dividing a sum of said mean flow velocities measured for each measurement path arranged in said upper region by a sum of said mean flow velocities measured for each measurement path arranged in said lower region, and wherein a liquid factor is calculated by multiplying said velocity ratio by said turbulence ratio.

Since both the velocity ratio and the turbulence ratio are indicative for a liquid being present, multiplication of these ratios results in an improved indicator parameter, the liquid factor, for the presence of a liquid.

In a further embodiment in accordance with the invention said liquid factor is compared to a predetermined liquid factor stored in a memory of said ultrasonic gas flow meter, wherein said predetermined liquid factor is selected to correlate to an amount of liquid present in said piping for a predefined flow velocity and wherein said comparison is used to determine said amount of liquid present in said piping for said measured flow velocity.

By comparing the measured liquid factor to a predetermined liquid factor one can correct the flow velocity measured with a liquid present by a factor which is correlated to the deviation value to result in the actual flow velocity value of the gas present in the piping.

In a further embodiment in accordance with the invention a set of predefined liquid factors are stored in said memory which correlate to different amounts of liquid present at different flow velocities for different types of gases and different types of liquids.

Storing a set of predefined liquid factors enables the measurement of the flow velocity, with a liquid being present, to be carried out faster, since only a comparison of the measured liquid factor to the predefined liquid factors has to take place to determine the correction factor for the gas flow, by which the measured gas flow has to be corrected.

In a further embodiment in accordance with the invention a plurality of said liquid factors is obtained and compared to said predefined liquid factors.

Measuring the liquid factor at certain time intervals allows the monitoring of whether there is an increase or decrease in the amount of liquid present in the piping, i.e. whether a leak in the gas transport system occurs, remains the same or, has been effectively removed.

In a further embodiment in accordance with the invention said method outputs at least one of said flow velocity, said mean flow velocity, said turbulence, said gas flow velocity, said turbulence ratio, said velocity ratio, said liquid factor and said amount of liquid present in said piping.

By outputting the individual results of the method, a pipeline operator can identify if one or more meters show a reduced gas flow indicating a presence of liquid in a part of the gas transport system. The operator can accordingly initiate that the part of the pipeline registering an increase in the liquid is shut off from the gas supply to ensure that as little liquid as possible is introduced into the system.

It is conceivable that these parameters are output and compared to threshold limits so that an automated shut down procedure could be included in a gas transport system. These threshold limits could be set in dependence on the type of gas for which the ultrasonic gas flow meter should be used, since e.g. a leak introducing water into a hydrogen gas transport system could also introduce air which could lead to severe damage of the system if this were to explode.

In embodiments in accordance with the invention one pair of measurement paths is present in said ultrasonic gas flow meter, preferably two pairs of measurement paths are present, particularly preferably three pairs of measurement paths are present and especially preferable four pairs of measurement paths are present in said ultrasonic gas flow meter.

Increasing the number of pairs of measurement paths in a piping of an ultrasonic gas flow meter, results in a more accurate measurement of the flow velocity and/or of the turbulence present in the piping. If the accuracy of the measurement is increased, the determination of the liquid factor and hence the amount of liquid present in the piping is significantly improved.

In a further aspect of the invention, there is provided an ultrasonic gas flow meter including a horizontal piping through which gas can flow in a flow direction and which has a central axis, at least one pair of measurement paths of equal length spaced apart, extending parallel to one another in separate horizontal planes and inclined to said flow direction, wherein each horizontal plane of a pair of measurement paths is vertically offset by an equal predefined distance from said central axis, wherein an ultrasonic transducer is arranged at each end of said measurement path and each ultrasonic transducer is adapted to selectively act as an ultrasonic transmitter and an ultrasonic receiver, the ultrasonic gas flow meter being adapted to measure a flow velocity of said gas in a measurement path arranged in an upper region of said piping, measure a flow velocity of said gas in a measurement path arranged in a lower region of said piping and use the results of these two measurements to predict if a liquid is present in said piping during said measurement.

In a further aspect of the invention, there is provided a gas transport system, including at least one horizontal transport piping, a gas input, a gas output and at least one ultrasonic gas flow meter which includes a horizontal piping through which gas can flow in a flow direction and which has a central axis, at least one pair of measurement paths of equal length spaced apart, extending parallel to one another in separate horizontal planes and inclined to said flow direction, wherein each horizontal plane of a pair of measurement paths is vertically offset by an equal predefined distance from said central axis, wherein an ultrasonic transducer is arranged at each end of said measurement path and each ultrasonic transducer is adapted to selectively act as an ultrasonic transmitter and an ultrasonic receiver, the ultrasonic gas flow meter also including an evaluation unit which is adapted to initiate a measurement of a flow velocity of said gas in a measurement path arranged in an upper region of said piping, a measurement of a flow velocity of said gas in a measurement path arranged in a lower region of said piping and to use the results of these two measurements to predict if a liquid is present in said piping during said measurement.

It should be noted that the typical types of gases conveyed in such systems are $N_2$, $O_2$, $H_2$, $CO_2$, $Cl_2$, natural gas etc. There is generally no technical restriction on the type of gas which can be guided through an ultrasonic gas flow meter.

Moreover, the term gas used in the present application can also mean a fluid if the medium transported in the gas transport system is predominantly a gas which can have a liquid component.

The ultrasonic gas flow meter and the transport system in accordance with the invention can be adapted using the features described with reference to the method in accordance with the invention and its advantageous embodiments.

The advantageous features are described in an exemplary manner only and are not intended to restrict the invented method or apparatus in any way.

Figure 2:
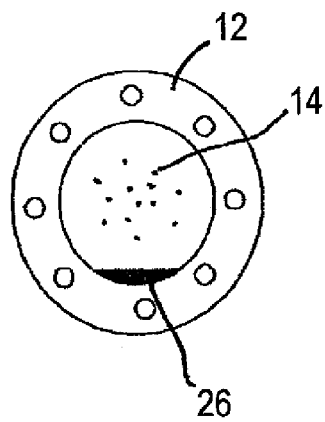
Figure 3:
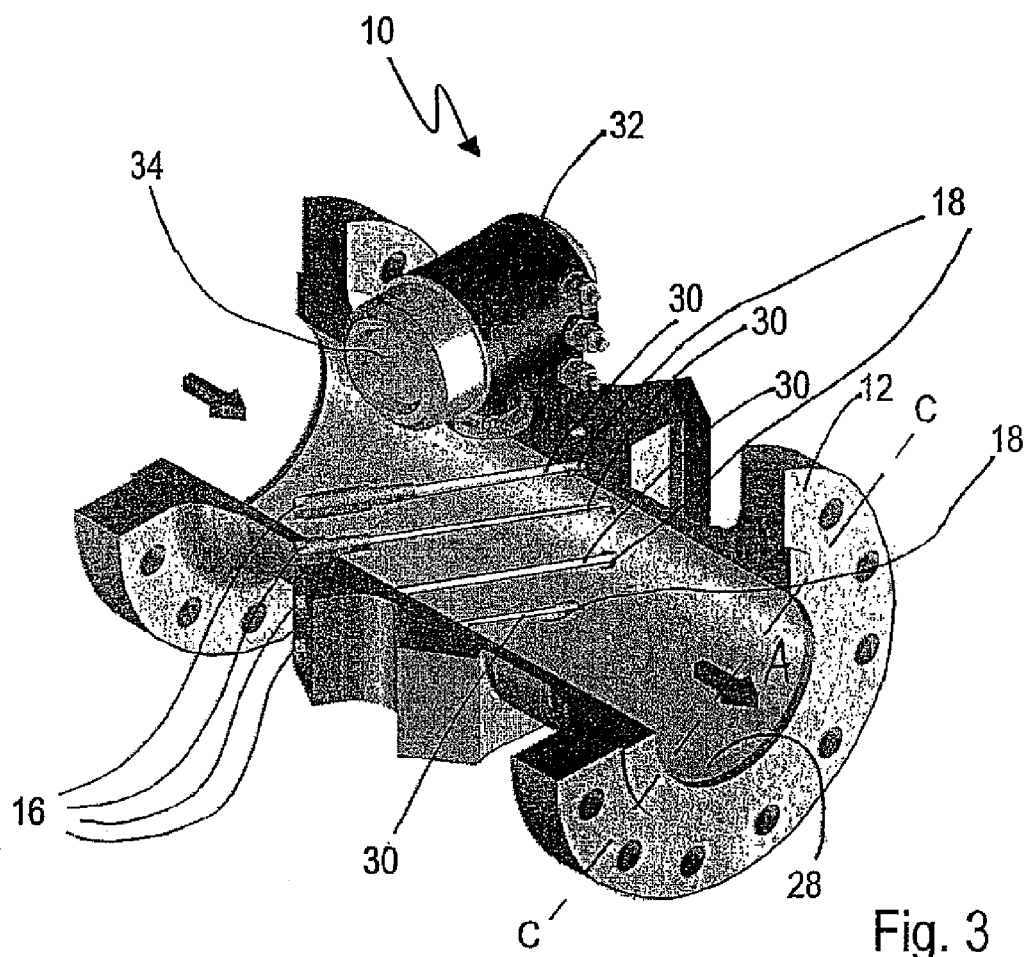
Figure 4:
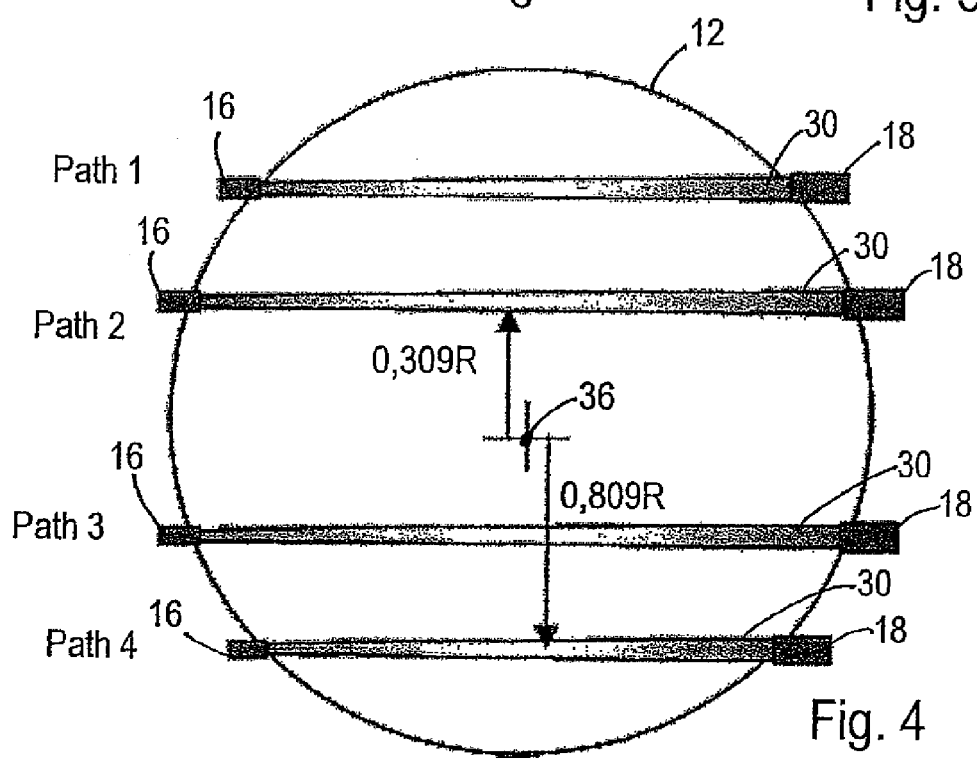
Figure 5:
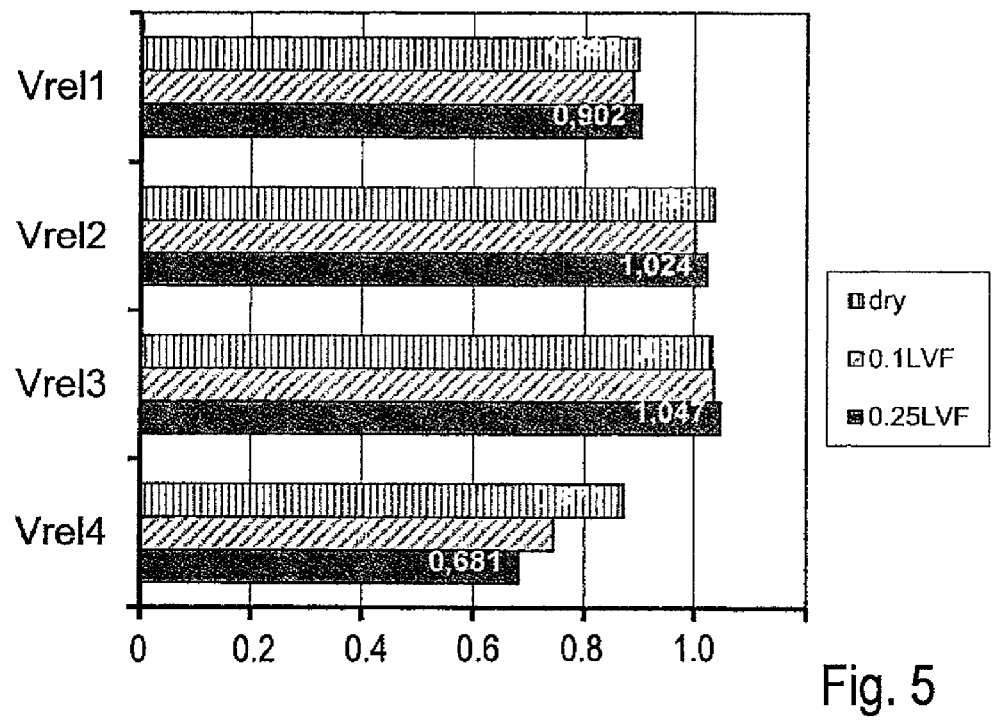
Figure 6:
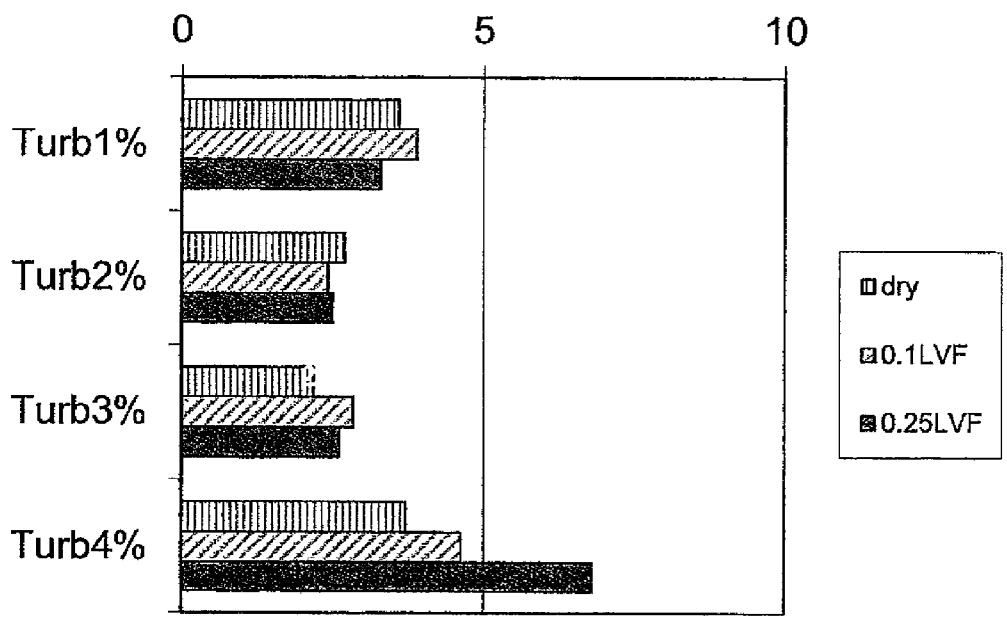
Figure 7:
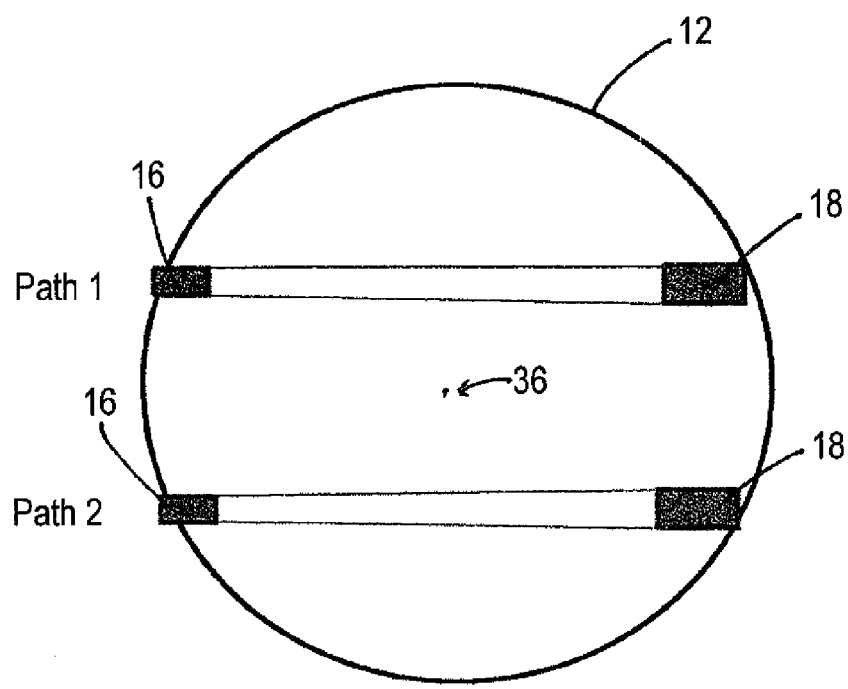
Figure 8:
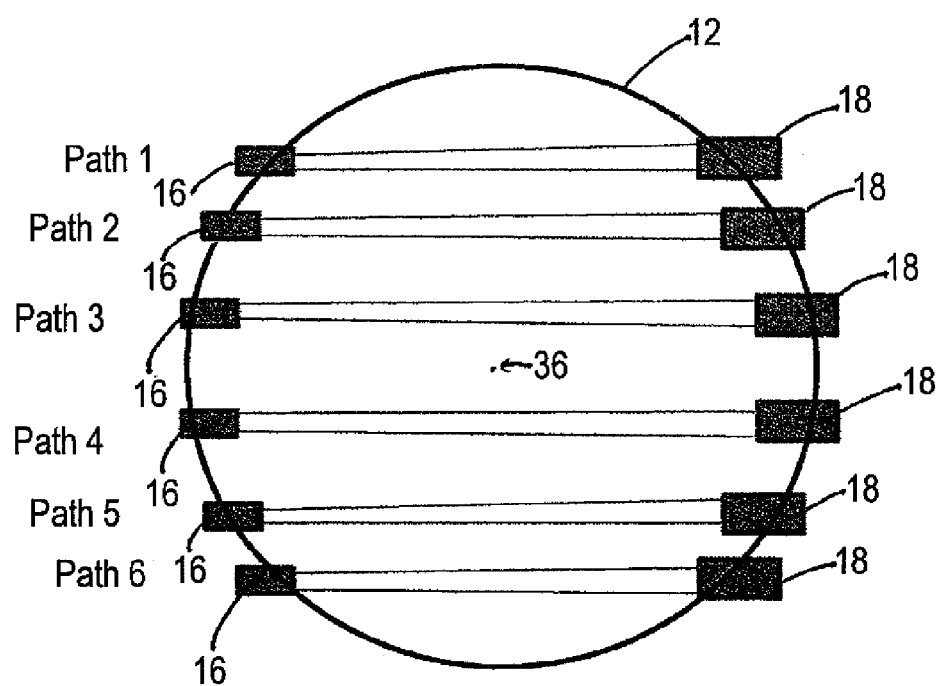
Figure 9:
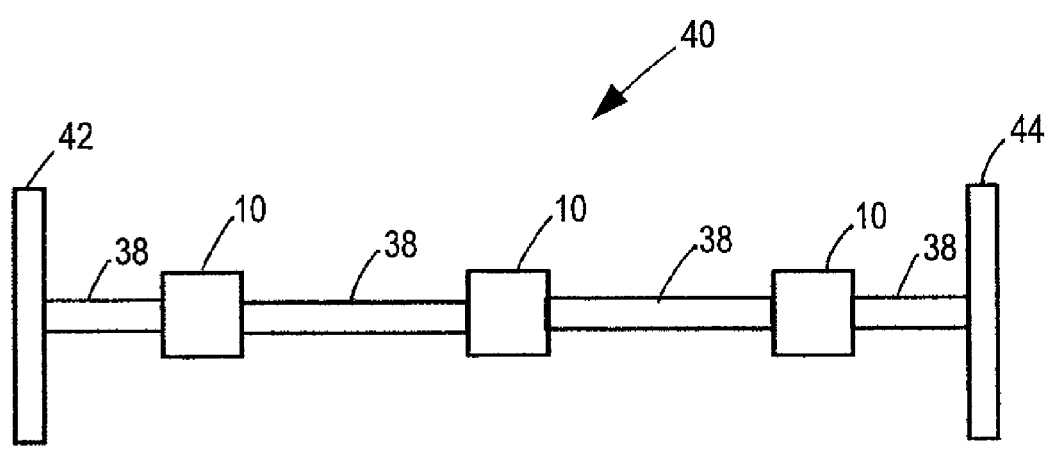

The invention will be described in the following with regard to further features and advantages by way of examples with reference to embodiments in the enclosed drawings. The Figures of the drawings show:

FIG. 1 a schematic representation indicating how propagation times are measured;

FIG. 2 a section through a piping containing an amount of liquid present in said piping;

FIG. 3 an embodiment of an apparatus to perform the method in accordance with the invention;

FIG. 4 a section through the embodiment of FIG. 3 in which a method in accordance with the invention can be carried out;

FIG. 5 a graph showing the relative flow velocities for the embodiment of FIG. 3;

FIG. 6 a graph showing the different turbulences from the embodiment in accordance with FIG. 3;

FIG. 7 a further section through an embodiment of an apparatus to perform a method in accordance with the invention;

FIG. 8 a further section through an embodiment of an apparatus to perform a method in accordance with the invention; and FIG. 9 a schematic view of a gas transport system including an ultrasonic gas flow meter adapted to perform a method in accordance with the invention.

Features having the same or similar function will be described in the following using the same reference numerals.

FIG. 1 shows a schematic representation indicating how a transit time ultrasonic gas flow meter 10 works in principle. In particular, FIG. 1 shows a section through a piping 12 indicating a flow direction A of the schematically illustrated flowing gas 14. In this example two ultrasonic transducers 16, 18 are disposed at opposite sides of the piping 12 separated by a path 20 having a length L which is inclined at an angle α to the flow direction A of the piping 12. Each ultrasonic transducer 16, 18 includes an ultrasonic transmitter 22 and an ultrasonic receiver 24. On activation of the ultrasonic gas flow meter 10 a first transducer 16 will transmit an ultrasonic signal which is received by a receiver 24 of a second transducer 18 and in a similar manner when the second transducer 18 is activated this can transmit an ultrasonic pulse along the path 20 which is subsequently received by the first transducer 16. Once a propagation time has been measured using the ultrasonic transducers 16, 18 and processed in electronics (see FIG. 3 below) associated with the ultrasonic gas flow meter 10, these propagation times can be used to calculate a flow velocity for a gas present in the piping.

It should be noted, that in the present context, the term piping is also used to denote a duct or a conduit, provided that this is a closed conduit or closed duct, i.e. a conduit which generally has no form of opening along the perimeter of its cross-section unless it is a connection point or an inlet/outlet.

The flow velocity can be calculated using equation 1 below:

$$v = \frac{T2 - T1}{T2 \cdot T1} \cdot \frac{L}{2\cos\alpha} \quad (1)$$

wherein v is the flow velocity of a medium flowing through the piping 12, T1 and T2 are the respective propagation times of an ultrasonic signal transmitted in or against the flow direction A. L is the path length of the ultrasonic path 20 and α is the angle at which this path is inclined to the flow direction A.

FIG. 2 shows a section through a piping 12 along a sectional line B:B of FIG. 1, in which the lower region contains an amount of liquid 26. The liquid 26 is collected at the bottom of the piping 12 due to gravitational forces and flows in the piping 12 in parallel to the gas transported in the gas transport system 40 (see FIG. 9).

Turning now to FIG. 3, we see an embodiment of an ultrasonic gas flow meter 10 which is arranged in a horizontal piping 12 and has four ultrasonic measurement paths 30 arranged in the cylindrical piping 12. Also shown is an evaluation unit 32 which is connected to the ultrasonic transducers 16, 18 of the four measurement paths 30 and which evaluates the respective flow velocities of the respective measurement paths 30 and is able to display the measurement results on its display 34.

The evaluation unit 32 contains electronic circuits required to operate the ultrasonic gas flow meter 10 and which is adapted to repeatedly measure the flow velocity of gas for each measurement path 30 and which is adapted to analyze the propagation times T1, T2 measured in the measurement paths 30. The evaluation unit 32 typically comprises a Digital Signal Processor (DSP) and at least one memory which stores the software required to calculate a flow velocity in the measurement paths 30 of an ultrasonic gas flow meter 10. The component parameters required (electronic components, geometric positioning, signal running times etc.) are all stored in the memory of the evaluation unit 32. The evaluation unit 32 also comprises the electronics required to operate the ultrasonic transducers 16, 18.

During the operation of the ultrasonic gas flow meter 10, the evaluation unit 32 activates a transmitter 22 of a first transducer 16 to transmit an ultrasonic signal along the measurement path 30 to a receiver 24 of a second ultrasonic transducer 18. Upon receiving the ultrasonic pulse the second ultrasonic transducer 18 transmits an ultrasonic pulse via its transmitter 22 which in turn is received by the receiver 24 of the first ultrasonic transducer 16. The evaluation unit 32 stores the respective times of transmittal and reception of the respective ultrasonic transducers 16, 18 of the respective measurement paths 30 present in the piping 12 of the ultrasonic gas flow meter 10 in an associated memory. Using the DSP present in the evaluation unit 32, the evaluation unit 32 is in the position to calculate the flow velocity v using equation (1) above from these measured propagation times T1, T2. The measured flow velocity v of each measurement path 30 can subsequently be used to detect if a liquid is present or not and/or be displayed on the display 34.

FIG. 4 shows a section along the sectional line C:C of FIG. 3, i.e. a view along the piping 12 of the ultrasonic gas flow meter 10 of the present invention. FIG. 4 clearly shows that each pair of measurement paths 30 is of equal length and offset from a central axis 36 by an equal amount forming two pairs of measurement paths 30. The fact that the transducers 18 arranged on the right hand side of FIG. 4 appear larger than those on the left hand side of FIG. 4 results from the measurement paths 30 being inclined to the flow direction A of the gas 14.

FIG. 5 shows a graph illustrating different relative flow velocities Vrel1, Vrel2, Vrel3, Vrel4 for the four different measurement paths 30 shown in FIG. 4. The different relative flow velocities are measured at a constant mean path velocity of 16 m/s for different amounts of liquid 26 present in the piping 12. The upper of each of the three relative measurements always shows a situation for a dry piping 12, the middle of each of the three relative measurements shows the piping 12 for a liquid volume fraction (LVF) of 10% and the lower of each of the three relative velocities shows the measured relative velocity for a liquid volume fraction of 25% of the piping 12. The relative flow velocities Vrel1, Vrel2, Vrel3, Vrel4 can be obtained e.g. by dividing the respective measured velocity by the mean path velocity.

As can clearly be seen from FIG. 5, the flow velocity Vrel4 of the lowest measurement path 30 is always reduced compared to the upper three measurement paths when a liquid 26 is present, i.e. the flow velocity of the lower region of the piping 12 is reduced compared to that in the upper region.

FIG. 6 shows the turbulence Turb1, Turb2, Turb3, Turb4 measured from each measurement path 30 for the same liquid volume fractions present as was the case for the piping 12 of FIG. 5. As can clearly be seen from FIG. 5 and from FIG. 6, the higher the liquid volume fraction present in the piping 12 this causes a reduction in the flow velocity and a significant increase in the turbulence present in the same in the region where the liquid 26 is present.

The ultrasonic gas flow meter of FIG. 7 has two measurement paths 30 present and the ultrasonic gas flow meter 10 of FIG. 8 has six measurement paths 30 present. There is generally no restriction on the amount of measurement paths 30 used in an ultrasonic gas flow meter 10, other than economic or space considerations; however, the measurement paths 30 selected in an ultrasonic gas flow meter 10 should always be arranged in pairs of equal path length L which are separated equidistant from the central axis 36. The individual pairs of measurement paths 30 can have a different path length L, but have to be arranged in the same vertical plane as the other measurement paths 30 and extending parallel to one another.

To determine a liquid volume fraction of said gas in the piping of the ultrasonic gas flow meter the flow velocity detected in each measurement path 30 of a pair of measurement paths 30 is measured repeatedly at a frequency of e.g. 10 Hz for 100 s, so that a mean velocity for 1000 measurements can be formed and a statistical spread for a certain mean flow velocity can be obtained for each measurement path. Generally speaking the frequency of measurement can be carried out in a range from 1 Hz to 100 kHz for a period of 1 s to 1000 s. These values are not intended to limit the invention in any way, they are just exemplary values for typical readout speeds of the electronics of an ultrasonic gas flow meter 10. The readout speed is essentially only dependent on the processing speed of the readout system used in the evaluation unit 32.

The statistical spread of the flow velocity is correlated to the turbulence present in the measurement path 30 and by comparing the turbulence of the different measurement paths 30, a statement on the liquid volume fraction present in the piping 12 of the ultrasonic gas flow meter 10 can be made.

In particular, by forming a turbulence ratio which is equal to the sum of the turbulences measured in measurement paths 30 present in an upper region of the piping 12 divided by the sum of the turbulences measured for the measurement paths 30 present in the lower region of the piping 12, it is automatically possible to recognize if there is a difference between the turbulence detected from the lower region compared to the turbulence detected from the upper region. This difference can indicate that a liquid is present in the piping.

By inspecting the turbulence measured in the different measurement paths 30 one can predict if a liquid 14 is present in the piping 12 during the measurement of the flow velocity, since the turbulence in the lowest measurement path 30 will be larger than that in the highest measurement path 30 if a liquid 26 is present in the piping. In particular, by dividing the turbulence measured for each measurement path 30 arranged in the lower region by a sum of the turbulences measured for each measurement path 30 arranged in the upper region, when the resultant turbulence ratio is approximately equal to 1, the piping 12 is considered to contain virtually no liquid and if the turbulence ratio is greater than 1 the piping 12 is considered to contain liquid 26.

Similarly a velocity ratio can be formed by dividing a sum of the mean flow velocities measured for each measurement path 30 arranged in the upper region by a sum of the mean flow velocities measured for each measurement path 30 arranged in the lower region of the piping. If the velocity ratio is approximately equal to one, then an operator of the ultrasonic gas flow meter 10 knows that there is virtually no liquid 26 present in the piping 12. However, if the velocity ratio is greater than one, the operator knows that liquid 26 is present in the piping. To determine the exact amount of the liquid present, the ultrasonic gas flow meter now calculates a liquid factor is calculated by multiplying the velocity ratio by the turbulence ratio.

For example, for a piping 12 in which two measurement paths 30 are present, the following equation can be used to calculate a liquid factor $S_2$ using the evaluation unit 32:

$$S_2 = \frac{v_1}{v_2} \cdot \frac{\delta_2}{\delta_1} \quad (2)$$

Where $\delta_1$ is the turbulence obtained from the upper measurement path, $v_1$ is the associated flow velocity and $v_2$, $\delta_2$ are the respective values obtained from the lower measurement path. For a piping 12 including four measurement paths 30 and for a piping 12 including six measurement paths 30, the following equations can be used to calculate the respective liquid factors $S_4$ and $S_6$:

$$S_4 = \frac{v_1 + v_2}{v_3 + v_4} \cdot \frac{\delta_3 + \delta_4}{\delta_1 + \delta_2} \quad (3)$$

$$S_6 = \frac{v_1 + v_2 + v_3}{v_4 + v_5 + v_6} \cdot \frac{\delta_4 + \delta_5 + \delta_6}{\delta_1 + \delta_2 + \delta_3} \quad (4)$$

Where $v_1$, $v_2$, $v_3$, $v_4$, $v_5$, $v_6$ and $\delta_1$, $\delta_2$, $\delta_3$, $\delta_4$, $\delta_5$, $\delta_6$ are the flow velocities and the turbulences obtained from the respective measurement paths (see FIGS. 4 and 8).

The measured liquid factor now corresponds to an amount of liquid present in a piping 12 for different flow velocities of the gas 14 present in the piping 12. Comparing a measured liquid factor S to predefined liquid factors, the method in accordance with the invention can easily determine the liquid volume fraction and the flow velocity of the gas present in the piping 12 of the ultrasonic gas flow meter 10. These predetermined liquid factors can be selected to correlate to an amount of liquid present in the piping 12 for a predefined flow velocity. Following the comparison of the measured liquid factor to a predetermined liquid factor the ultrasonic gas flow meter 10 can then determine the actual flow velocity of the gas 14 present in the piping 12, by correcting the measured flow velocity by a predefined factor correlated to the predefined liquid factor to which it is compared. The comparison is typically carried out in the evaluation unit 32 of an ultrasonic gas flow meter 10. The predetermined liquid factors $S_2$, $S_4$, $S_6$ are stored in a memory of the evaluation unit 32.

FIG. 9 shows a schematic representation of a gas transport system 40, in which three ultrasonic gas flow meters 10 are arranged between transport pipings 38 which can be connected either using connection flanges or by welding the individual pipings 12, 38 together. At the left hand side of FIG. 9, a gas input 42 is shown which can be connected to a reservoir and, at the right hand side of FIG. 9, a gas output 44 is shown. The gas transport system 40 can be a natural gas pipeline which is used to transport natural gas from a natural gas platform to a gas terminal.

LIST OF REFERENCE NUMERALS 10 ultrasonic gas flow meter
12 piping
14 gas
16 ultrasonic transducer
18 ultrasonic transducer
20 path
22 transmitter
24 receiver
26 liquid
28 inner walls
30 measurement path
32 evaluation unit
34 display
36 central axis
38 transport piping
40 gas transport system
42 gas input
44 gas output
A flow direction
L path length
S liquid factor
T1 propagation time
T2 propagation time

The invention claimed is:

1. A method of measuring a gas flow velocity using an ultrasonic gas flow meter (10),
   wherein said ultrasonic gas flow meter (10) includes a horizontal piping (12) through which gas (14) can flow in a flow direction (A) and which has a central axis (36), at least one pair of measurement paths (30) of equal length spaced apart, extending parallel to one another in separate horizontal planes and inclined to said flow direction (A),
   wherein each horizontal plane of a pair of measurement paths (30) is vertically offset by an equal predefined distance from said central axis (36),
   wherein an ultrasonic transducer (16, 18) is arranged at each end of said measurement path (30) and each ultrasonic transducer (16, 18) is adapted to selectively act as an ultrasonic transmitter (22) and an ultrasonic receiver (24), the method comprising the steps of measuring a flow velocity of said gas (14) in a measurement path (30) arranged in an upper region of said piping (12), measuring a flow velocity of said gas (14) in a measurement path (14) arranged in a lower region of said piping (12) and using the results of these two measurements to predict if a liquid (24) is present in said piping (12) during said measurement,
   wherein said measurement of the respective flow velocities is repeated at a predetermined frequency and for a predetermined time period, to form a mean flow velocity and a statistical spread for each measurement path (30), wherein said statistical spread is correlated to a turbulence present in said measurement path (30),
   wherein a turbulence ratio is formed by dividing a sum of said turbulences measured for each measurement path (30) arranged in said lower region by a sum of said turbulences measured for each measurement path (30) arranged in said upper region,
   and wherein a velocity ratio is formed by dividing a sum of said mean flow velocities measured for each measurement path (30) arranged in said upper region by a sum of said mean flow velocities measured for each measurement path (30) arranged in said lower region, and wherein a liquid factor (S2; S4; S6) is calculated by multiplying said velocity ratio by said turbulence ratio.

2. A method in accordance with claim 1, wherein said ultrasonic gas flow meter (10) measures a flow velocity of said gas (14) flowing through said piping (14) on the basis of differences between propagation times (T1, T2) of ultrasonic signals transmitted and received between each pair of transducers (16, 18) and propagating in opposite directions along each measurement path (30).

3. A method in accordance with claim 1, wherein a comparison of said flow velocity from said upper region to said flow velocity from said lower region is carried out to predict if liquid is present in said piping (12).

4. A method in accordance with claim 1, wherein a comparison between said turbulence present in said measurement paths (30) is carried out to predict if a liquid (26) is present in said piping (12) during said measurement.

5. A method in accordance with claim 1, wherein if said turbulence ratio is approximately equal to _b 1, said piping (12) is considered to contain virtually no liquid and if said turbulence ratio is greater than 1, said piping (12) is considered to contain an amount of liquid.

6. A method in accordance with claim 1, wherein said liquid factor (S2; S4; S6) is compared to a predetermined liquid factor stored in a memory of said ultrasonic gas flow meter (10), wherein said predetermined liquid factor is selected to correlate to an amount of liquid (26) present in said piping (12) for a predefined flow velocity and wherein said comparison is used to determine said amount of liquid (26) present in said piping (12) for said measured flow velocity.

7. A method in accordance with claim 6, wherein a set of predefined liquid factors are stored in said memory which correlate to different amounts of liquid present at different flow velocities for different types of gases and different types of liquids.

8. A method in accordance with claim 1, wherein a plurality of said liquid factors (S2; S4; S6) is obtained and compared to said predefined liquid factors.

9. A method in accordance with claim 1, wherein said method outputs at least one of said flow velocity, said mean flow velocity, said turbulence, said gas flow velocity, said turbulence ratio, said velocity ratio, said liquid factor (S2; S4; S6) and said amount of liquid (26) present in said piping (12).

10. A method in accordance with claim 1, wherein one pair of measurement paths (30) is present in said ultrasonic gas flow meter (10).

11. A method in accordance with claim 1, wherein two pairs of measurement paths (30) are present in said ultrasonic gas flow meter (10).

12. A method in accordance with claim 1, wherein three pairs of measurement paths (30) are present in said ultrasonic gas flow meter (10).

13. A method in accordance with claim 1, wherein four pairs of measurement paths (30) are present in said ultrasonic gas flow meter (10).

14. An ultrasonic gas flow meter (10) including a horizontal piping (12) through which gas (14) can flow in a flow direction (A) and which has a central axis (36), at least one pair of measurement paths (30) of equal length spaced apart, extending parallel to one another in separate horizontal planes and inclined to said flow direction (A), wherein each horizontal plane of a pair of measurement paths (30) is vertically offset by an equal predefined distance from said central axis (36), wherein an ultrasonic transducer (16, 18) is arranged at each end of said measurement path (30) and each ultrasonic transducer (16, 18) is adapted to selectively act as an ultrasonic transmitter (22) and an ultrasonic receiver (24), the ultrasonic gas flow meter (10) also includes an evaluation unit (32) which is adapted to initiate a measurement of a flow velocity of said gas (14) in a measurement path (30) arranged in an upper region of said piping (12), a measurement of a flow velocity of said gas (14) in a measurement path (30) arranged in a lower region of said piping (12) and to use the results of these two measurements to predict if a liquid (24) is present in said piping (12) during said measurement, wherein said measurement of the respective flow velocities is repeated at a predetermined frequency and for a predetermined time period, to form a mean flow velocity and a statistical spread for each measurement path (30), wherein said statistical spread is correlated to a turbulence present in said measurement path (30), wherein a turbulence ratio is formed by dividing a sum of said turbulences measured for each measurement path (30) arranged in said lower region by a sum of said turbulences measured for each measurement path (30) arranged in said upper region, and wherein a velocity ratio is formed by dividing a sum of said mean flow velocities measured for each measurement path (30) arranged in said upper region by a sum of said mean flow velocities measured for each measurement path (30) arranged in said lower region, and wherein a liquid factor (S2; S4; S6) is calculated by multiplying said velocity ratio by said turbulence ratio.

15. A gas transport system (40), including at least one horizontal transport piping (38), a gas input (42), a gas output (44) and at least one ultrasonic gas flow meter (10) including a horizontal piping (12) through which gas (14) can flow in a flow direction (A) and which has a central axis (36), at least one pair of measurement paths (30) of equal length spaced apart, extending parallel to one another in separate horizontal planes and inclined to said flow direction (A), wherein each horizontal plane of a pair of measurement paths (30) is vertically offset by an equal predefined distance from said central axis (36), wherein an ultrasonic transducer (16, 18) is arranged at each end of said measurement path (30) and each ultrasonic transducer (16, 18) is adapted to selectively act as an ultrasonic transmitter (22) and an ultrasonic receiver (24), the ultrasonic gas flow meter (10) also includes an evaluation unit (32) which is adapted to initiate a measurement of a flow velocity of said gas (14) in a measurement path (30) arranged in an upper region of said piping (12), a measurement of a flow velocity of said gas (14) in a measurement path (30) arranged in a lower region of said piping (12) and to use the results of these two measurements to predict if a liquid (24) is present in said piping (12) during said measurement, wherein said measurement of the respective flow velocities is repeated at a predetermined frequency and for a predetermined time period, to form a mean flow velocity and a statistical spread for each measurement path (30), wherein said statistical spread is correlated to a turbulence present in said measurement path (30), wherein a turbulence ratio is formed by dividing a sum of said turbulences measured for each measurement path (30) arranged in said lower region by a sum of said turbulences measured for each measurement path (30) arranged in said upper region, and wherein a velocity ratio is formed by dividing a sum of said mean flow velocities measured for each measurement path (30) arranged in said upper region by a sum of said mean flow velocities measured for each measurement path (30) arranged in said lower region, and wherein a liquid factor (S2; S4; S6) is calculated by multiplying said velocity ratio by said turbulence ratio.

* * * * *

UNITED STATES PATENT AND TRADEMARK OFFICE
CERTIFICATE OF CORRECTION

PATENT NO. : 8,245,582 B2  Page 1 of 1
APPLICATION NO. : 12/883363
DATED : August 21, 2012
INVENTOR(S) : Lansing et al.

It is certified that error appears in the above-identified patent and that said Letters Patent is hereby corrected as shown below:

Column 11, Claim 5, Line 14
Please delete "_b"

Signed and Sealed this
Twenty-fifth Day of December, 2012

David J. Kappos
*Director of the United States Patent and Trademark Office*